United States Patent [19]
Yang et al.

[11] Patent Number: 6,009,045
[45] Date of Patent: Dec. 28, 1999

[54] ADVANCED VERTICAL ARRAY BEAMFORMER

[75] Inventors: Tsih C. Yang, Great Falls, Va.; Kwang B. Yoo, Silver Spring, Md.

[73] Assignee: The United States of America as represented by the Secretary of the Navy, Washington, D.C.

[21] Appl. No.: 09/133,852

[22] Filed: Aug. 13, 1998

[51] Int. Cl.$^6$ ..................................... G01S 3/86
[52] U.S. Cl. ........................................ 367/119; 367/103
[58] Field of Search ................................... 367/103, 119, 367/138

[56] References Cited

U.S. PATENT DOCUMENTS

| | | | |
|---|---|---|---|
| 3,701,147 | 10/1972 | Whitehouse | 340/347 DA |
| 3,766,496 | 10/1973 | Whitehouse | 331/107 A |
| 4,315,326 | 2/1982 | Chase | 367/134 |
| 4,420,285 | 12/1983 | Maynard et al. | 367/122 |
| 5,539,836 | 7/1996 | Weinstein et al. | 381/94 |
| 5,563,849 | 10/1996 | Hall et al. | 367/127 |
| 5,581,495 | 12/1996 | Adkins et al. | 364/724.16 |
| 5,914,912 | 6/1999 | Yang | 367/119 |

OTHER PUBLICATIONS

Hanson; The Theoretical Response of Vertical and Horizontal Line Arrays to Wind Induced Noise in Shallow Water; J.Acous.Soc.Am. vol. 78, No. 5, pp. 1702–1712, Nov. 1985.

Yang; Modal Shading Coefficients for High–Resolution Source Depth Localization; J.Acous.Soc.Am. vol. 87, No. 2, pp. 668–672, Nov. 1987.

Yang; A Method of Range and Depth Estimation by Modal Decomposition; J.Acous.Soc.Am. vol. 82, No. 5, pp. 1736–1745, Nov. 1987.

Tabrikian et al.; Robust Maximum–Liklihood Source Localization in an Uncertian Shallow–Water Waveguide; J.Acous.Soc.Am. vol. 191, No. 1, pp. 241–249, Jan. 1997.

Yang et al.; Modeling the Enviromental Influence on the Vertical Directionality of Ambient Noise in Shallow Water; J.Acous.Soc.Am. vol. 101.No. 5, pp. 2541–2554, May 1997.

Byrne et al.; A Stable Data–Adaptive Method for Hatched Field Array Processing in Acoustic Waveguides; J.Acous.Soc.Am, vol. 87, No. 6, pp. 2493–2502. Jun. 1990.

Yang et al.; Modeling the Enviromental Influance on Noise Vertical Directionality in Shallow Water; J.Acous.Soc.Am. vol. 101, pp. 2541–2554, 1997.

Porter, M.B.; The Kraken Normal Mode Program; NRL Rpt. No. NRL/MR/5120–92–6920; May 22, 1992.

Ozard et al.; Improving Performance for Hatched–Field Processing with a Minimum Varience Beam Former; J.Acous.Soc.Am, vol. 91, No. 1, pp. 141–150, Jan. 1992.

*Primary Examiner*—Ian J. Lobo
*Attorney, Agent, or Firm*—Barry A. Edelberg; Charles J. Stockstill

[57] ABSTRACT

The advanced vertical array beamformer signal processor accomplishes acoustic beamforming of an underwater vertical array used in shallow water utilizing matched beam processing to suppress generated noise and/or ship radiated noise thereby increasing the detectability of a submerged source emitting only a low noise signal. The processor exploits the difference of the signal arrival angle of both active and passive signals with that of the wind generated noise and ship radiated noise which is prominent in downward refractive sound speed profiles. After filtering the undesired noise, the processor uses the depth of the source as a clue for detection; the processor is an energy detector focused on the returns of a deep source.

5 Claims, 6 Drawing Sheets

ADVANCED VERTICAL ARRAY BEAMFORMER

BACKGROUND OF THE INVENTION

1. Field of the Invention

This invention pertains generally to a device for acoustic beamforming for an underwater vertical array and more specifically to a device for use in shallow water wherein an advanced signal processor utilizing matched beam processing is used to suppress surface generated noise and/or ship radiated noise thereby increasing the detectability of a submerged source emitting only a low noise signal.

2. Description of the Related Art

In underwater acoustics, signal processing is an important tool to enhance the detectability of a signal among unwanted signals (noise) originating from various sources. Since the signal and noise show characteristic directionality in elevation angles, the detection and localization of a submerged source can be improved by adaptive array signal processing which exploits this difference in signal and noise arrival angles. A well known example is adaptive nulling of strong interferences for a horizontal array using adaptive beamforming.

Air-deployed sonobuoy vertical arrays use fixed preformed beams to detect signal returns from a passive acoustic source or echo from a submerged object when the signal arrival angle is distinctly different from that of the noise or an interfering source such as a surface ship. With a bottom bounced arrival of a signal the processor uses a delay and sum technique assuming a plane wave arrival for the signal in what is commonly known as the conventional beamformer. The beams are normally focused on the bottom returns of the signal in the first convergence zone of the signal arrivals. A submerged source will be detected by the bottom bounced arrival in deep water as the bottom arrival is relatively clean and free of clutter.

In shallow water, because the signal arrives via many bottom bounced arrivals, the signal energy can be split over several beams. This results in less than theoretical signal gain. The less than optimal signal gain degrades the detection range of the vertical array. There is no clearly defined convergence zone in shallow water. Target range cannot be estimated easily as the difference in multipath arrival angles is comparable or larger than the beam width.

A highly directional noise field can be found in shallow water in summer with a downward refractive sound speed profile. The detection and localization performance of a vertical array against a submerged target in shallow water can be significantly improved if the noise field is directional and the signal arrives in the null (notch) of the noise field. This often happens in a summer environment with the downward refractive sound speed profile in which the surface generated noise field exhibits a notch in the noise vertical directionality distribution at mid (e.g., 500 Hz) frequencies. The noise notch can be weakened or disappear when sound propagation is associated with strong mode coupling.

In a directional noise field when the signal arrives in directions near the noise notch, conventional beamforming can be used to improve the array gain by steering the beams to the shallow arrival angle of the target signal where the noise level is weak. Array gain is a maximum where the incoming wave is confined to one beam. In a multipath environment, the signal arriving on a vertical array can be split into several beams. The signal gain (SG) degradation due to beam splitting often results in a less than theoretical array gain (AG) for conventional beamforming.

Conventional beamforming has been widely used for detection and estimation of a target. In the target look direction, the signals are delayed and summed to yield the highest beam power. In conventional beamforming, the signal gain (SG) of a vertical array is obtained by $$SG(\theta) = N^2 \frac{s^\dagger Rs}{s^\dagger s \langle p^\dagger p \rangle} \tag{1}$$

where R is the covariance matrix of the signal averaged over many data samples, s is a steering vector with elements of $e^{-ikz_j \sin\theta}$ and p is the data field. The angle bracket denotes average of data over different samples. The k is the wavenumber of the propagating sound wave, $z_j$, is the depth of the j-th phone and N is the total number of phones in the array. The angle $\theta$ is measured from the broad side of the array. As it is clear from the above equation, SG will be maximized when $\theta$ is chosen to match the strongest signal power direction. The noise gain (NG) is similarly defined with a replacement of signal power with a noise power in the above expression.

Matched field processing overcomes the signal gain degradation problem by using a replica field which matches the signal field. When the replica source range and depth coincides with the true source range and depth, the processor yields a theoretical signal gain of 20 log N, where N is the number of sensors. Matched field processing yields a theoretical 10 log N array gain assuming Gaussian white or uncorrelated noise. While noise can be assumed uncorrelated for a horizontal array with proper spacing, it is not in the case of the vertical array. Numerical simulation, theoretical models, and experimental data have all indicated that the surface generated noise is non-isotropic, non-Gaussian, and highly directional in shallow water. For the shallow water case, matched field processing has a limited ability to reject the noise as the correlation of the replica filed with the noise field is not always negligible.

For a vertical array, the matched field processor uses range and depth to discriminate the source from the noise. In principle, the signal would show up as a high level peak at the true source location in the range-depth ambiguity plot where the replica field matches the signal data. Likewise, when the replica field matches the noise data, the local peak will show up in the ambiguity plot indicating the location of the noise sources which should be near the surface. As such, the signal and noise sources are separated by their depths and hence in principle, the signal will be enhanced using depth and range as a discriminator. In practice, this does not work very well in shallow water, because of the extended sidelobes to the source depth. Each surface noise source will produce sidelobes at other depths and ranges other than the true noise source range and depth. Since there are many noise sources spread over the ocean surfaces, the sidelobes from these noise sources accumulate and produce a sizable noise background at the range and depth of the submerged source. This noise background reduces the array gain to below the theoretical array gain.

SUMMARY OF THE INVENTION

The object of this invention is to provide a device for acoustic beamforming for an underwater vertical array for use in shallow water.

This and other objectives is accomplished by an advanced vertical array beamformer signal processor which accomplishes acoustic beamforming of an underwater vertical array used in shallow water utilizing matched beam processing to suppress generated noise and/or ship radiated noise thereby increasing the detectability of a submerged source emitting only a low noise signal. The processor exploits the difference of the signal arrival angle of both active and passive signals with that of the wind generated noise and ship radiated noise which is prominent in downward refractive sound speed profiles. After filtering the undesired noise, the processor uses the depth of the source as a clue for detection. The processor forms an energy detector focused on the returns of a deep source, which exploits the differences in mode excitations by the deep source and the surface sources. This detector can be used to detect the presence of a submerged source without requiring precise knowledge of the source range.

DESCRIPTION OF THE PREFERRED EMBODIMENT

The matched beam processor is matched field processing in the beam domain. It takes the conventional beamformed data as input and correlates that with the beam outputs of the replica field. Since the beam domain is mathematically a wavenumber transform of the phone domain data, matched beam processing is identical to matched field processing by the convolution theorem when all beams are included. However, a matched beam processor offers a beam filter to exclude certain beams which are dominated by the noise. By exploiting the difference of the noise and the signal, the output signal-to-noise ratio of the processor is significantly enhanced over that of conventional beamforming and matched field processing. It is shown that the noise level in matched beam range-depth ambiguity surface is substantially reduced by the use of the beam filter. The adaptive processing of the noise is responsible for the enhanced array gain of matched beam processing. The beam filter may degrade the signal gain slightly depending on the separation of the signal and noise arrival angles, but the signal gain degradation is much less than the gain in the adaptive noise processing.

The concept of a beam filter is naturally incorporated in conventional beamforming. A more advanced beam filter is well known adaptive nulling of the interference sources for a horizontal array in the bearing domain. The array gain for the vertical array in shallow water can be higher than 10 log N in a directional noise field when the signal arrives in the null of the noise beams. In this case conventional beamforming has filtered the noise outside the signal beam. This concept is extended to the matched field processing by incorporating a beam filter using the matched beam processor. The reason matched beam processing array gain is higher than that of the conventional beamforming is because the signal arrivals are coherently combined. In comparison, the reason the matched beam array gain is higher than that of matched field processing is because of the noise suppression by the beam filter. The improved array gain of matched beam processor over that of conventional beamforming and matched field processing is expected to double the detection range in typical shallow water with a downward refractive sound profile.

Matched beam processing correlates the replica field and data in the beam domain. The SG is given by $$SG(r, z) = N^2 \frac{b^\dagger R_B b}{b^\dagger b \langle d^\dagger d \rangle} \qquad (2)$$

where d is the data beam vector, and b is the replica beam vector obtained by conventional beamforming of the data and replica field, respectively $$d_i = \sum_j e^{-ikz_j \sin\theta_i} p^{data}(z_j) \equiv \sum_j G_{ij} p_j^{data} \qquad (3)$$

$$b_i(r, z) = \sum_j e^{-ikz_j \sin\theta_i} p^{rplc}(z_j, r, z) \equiv \sum_j G_{ij} p_j^{rplc} \qquad (4)$$

where the beam number i is designated by the beam angle $\theta_i$. The G matrix represents a Fourier transform from the phone domain to the wavenumber (K=ksinθ) domain and is hence unitary. The beam covariance matrix $R_B$ is given by $$R_B = GRG^\dagger = \langle dd^\dagger \rangle, \qquad (5)$$

where $G^\dagger$ represents the inverse Fourier transform. Since $G^\dagger G = I$, Eq. (2) reduces to the matched field SG.

Adaptive beamforming can be incorporated into matched beam processing by replacing Eqs. (3) and (4) with the adaptive beamforming formula. For excluding beams containing excess noise, the weighting will be done directly in the beam domain using $$\tilde{b}_i(r, z) = b_i \beta_i = \sum_j e^{-ikz_j \sin\theta_i} p^{rplc}(z_j, r, z) \beta_i. \qquad (6)$$

To exclude the high angle ($|\theta_i| > \theta_0$) beams, use a beam filter $$\beta_i = \begin{cases} 0 & \text{for } |\theta_i| > \theta_0, \\ 1 & \text{for } |\theta_i| \leq \theta_0. \end{cases} \qquad (7)$$

The matched beam SG differs from the matched field SG, the matched beam SG depends upon the choice of $\theta_0$.

With the beam filter β, the concept of noise rejection using beam steering (as used in CBP) is incorporated into matched field processing using MBP.

Both MFP and MBP localize a source in range and depth, but not conventional beam processing (CBP). MBP yields the same range and depth ambiguity surface as MFP if all beams are used in the MBP. But only if a small number of beams are used in MBP, the resulting ambiguity surface is different from the MBP surface. The MBP ambiguity surface can be used to illustrate the effectiveness of the beam filter. The noise level at a deep depth in the MPB ambiguity surface is reduced significantly with the beam filter than without the beam filter. This is where noise gain is achieved.

With a signal present, the sidelobe levels relative to the peak (signal) is dependent on the processor used. For a shallow water environment, both MFP and MBP produce high sidelobes levels when the Bartlett processor is used. The ambiguity surface using Minimum Variance (MV) processing yields a higher peak at the source than elsewhere (i.e., higher peak-to-sidelobe ratios).

In practical applications, detection is often of higher priority than localization of the source. The question whether there is a source within a certain range of a detector is more critical than where is the source. In this regard, it has been suggested that a submerged source could be discriminated against the surface ships using the depth as a discriminator. Matched field can discriminate the submerged source from the surface ship but it requires the range of the source to be simultaneously determined. Source localization in shallow water has the well-known environmental mismatch problem.

Figure 1A:
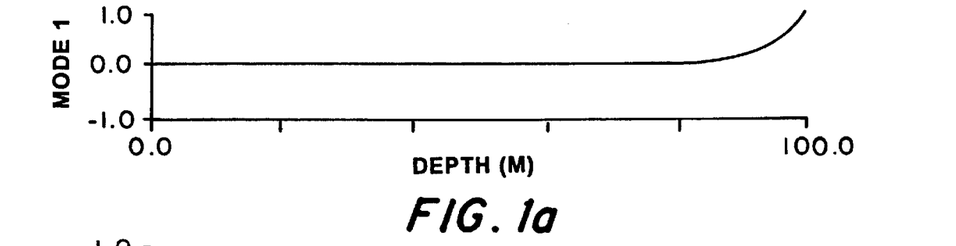
FIG. 1a shows a first mode depth function.
Figure 1B:
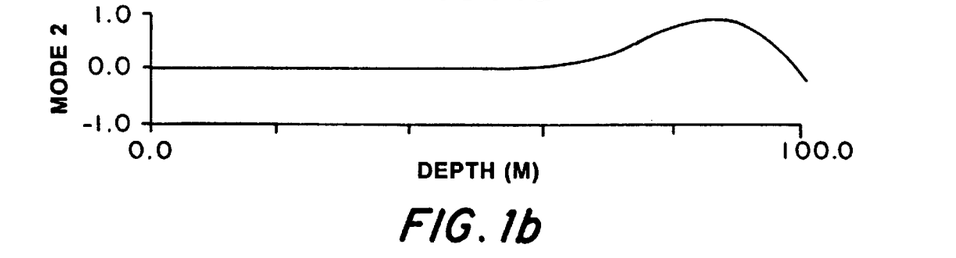
FIG. 1b shows a second mode depth function.
Figure 1C:
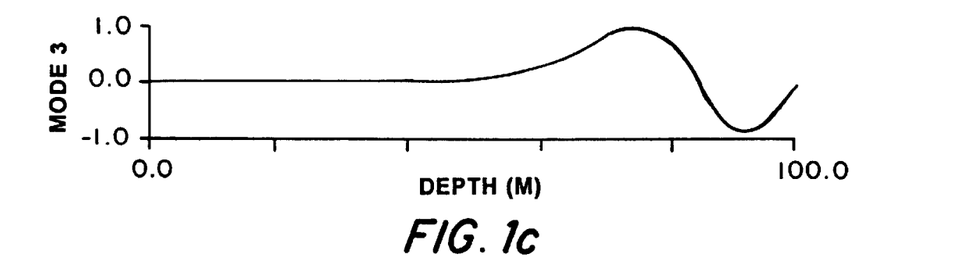
FIG. 1c shows a third mode depth function.
Figure 1D:
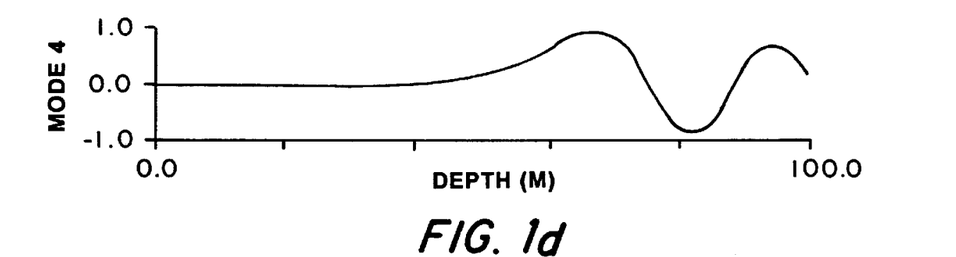
FIG. 1d shows a fourth mode depth function.
Figure 1E:
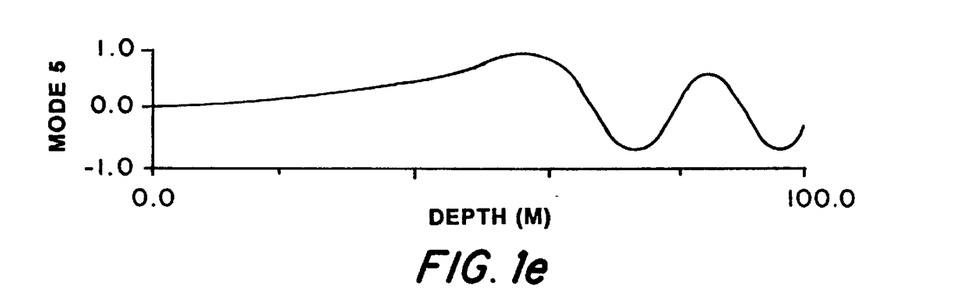
FIG. 1e shows a fifth mode depth function.
Figure 2:
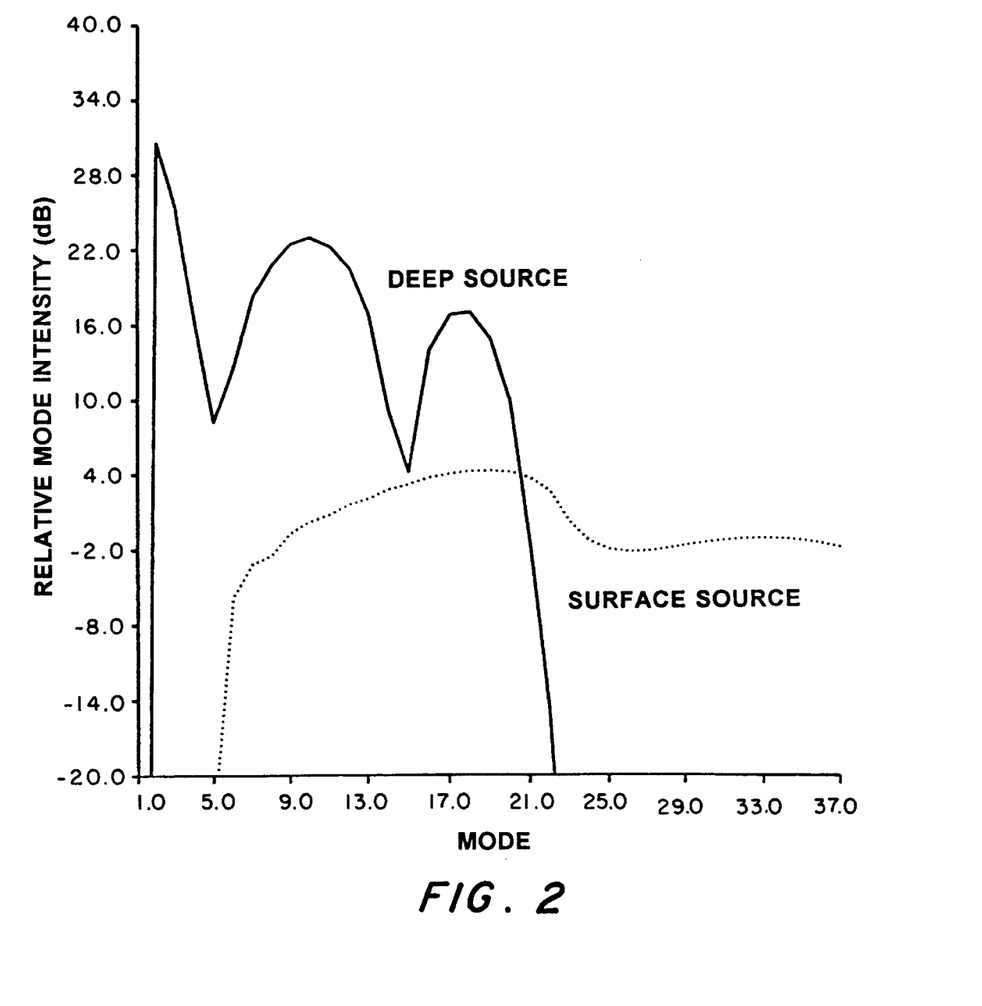
FIG. 2 shows the difference in mode excitations due to a deep source and surface source.

Target discrimination by depth can be done without knowing the source range. The concept is as follows: The submerged source should couple well with the low order normal modes in the water column due to which have high amplitudes at the source depth. See FIGS. 1a–e. The surface noise source and the surface ship should couple primarily with higher order normal modes. FIG. 2 shows the difference in mode excitations due to a deep source and surface source. Consequently, by projecting the signal to the mode space, or multiplying the signals with the mode depth functions one can discriminate the submerged source from the surface ships and surface noise sources.

Figure 3:
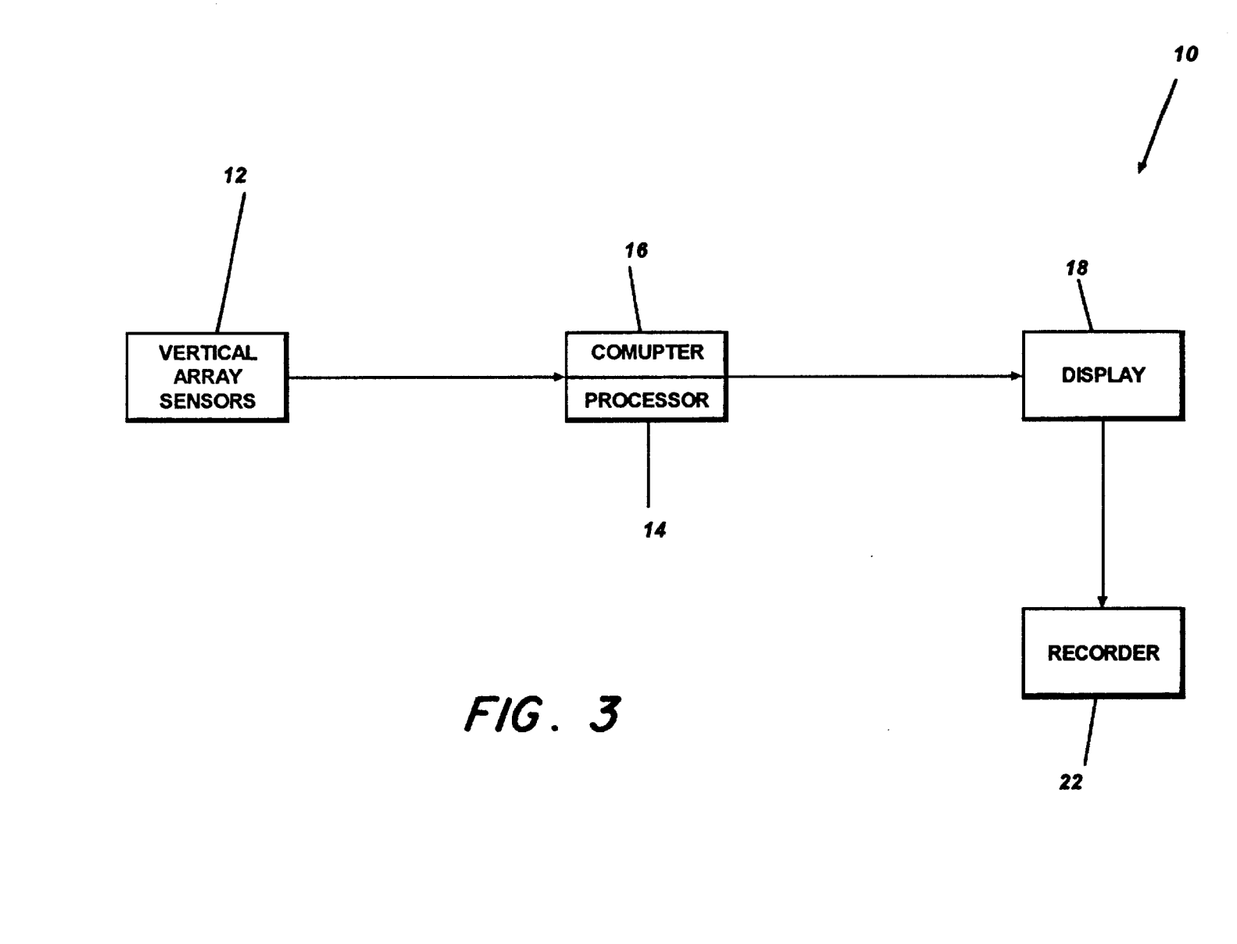
FIG. 3 shows an advanced vertical array.

The advanced vertical array system 10, as shown in FIG. 3, is a technique for acoustic beamforming of an underwater vertical array 12 used in shallow water wherein an advanced signal processor 14 is used to (1) suppress wind generated noise and ship radiated noise, and (2) coherently combine the multipath returns of the signal, thereby improving the ability of a vertical array to acoustically sense (detect) a submerged object in a water column, (3) develop an energy detector for a deep source without requiring precise range estimations.

The processor 14 exploits the difference of the signal arrival angle with that of the wind generated noise and ship radiated noise which is most prominent in downward refractive sound speed profiles. After filtering the undesired noise, the processor 14 uses the depth of the source as a clue for detection; the processor 14 is an energy detector focused on the returns of a deep source.

Figure 4:
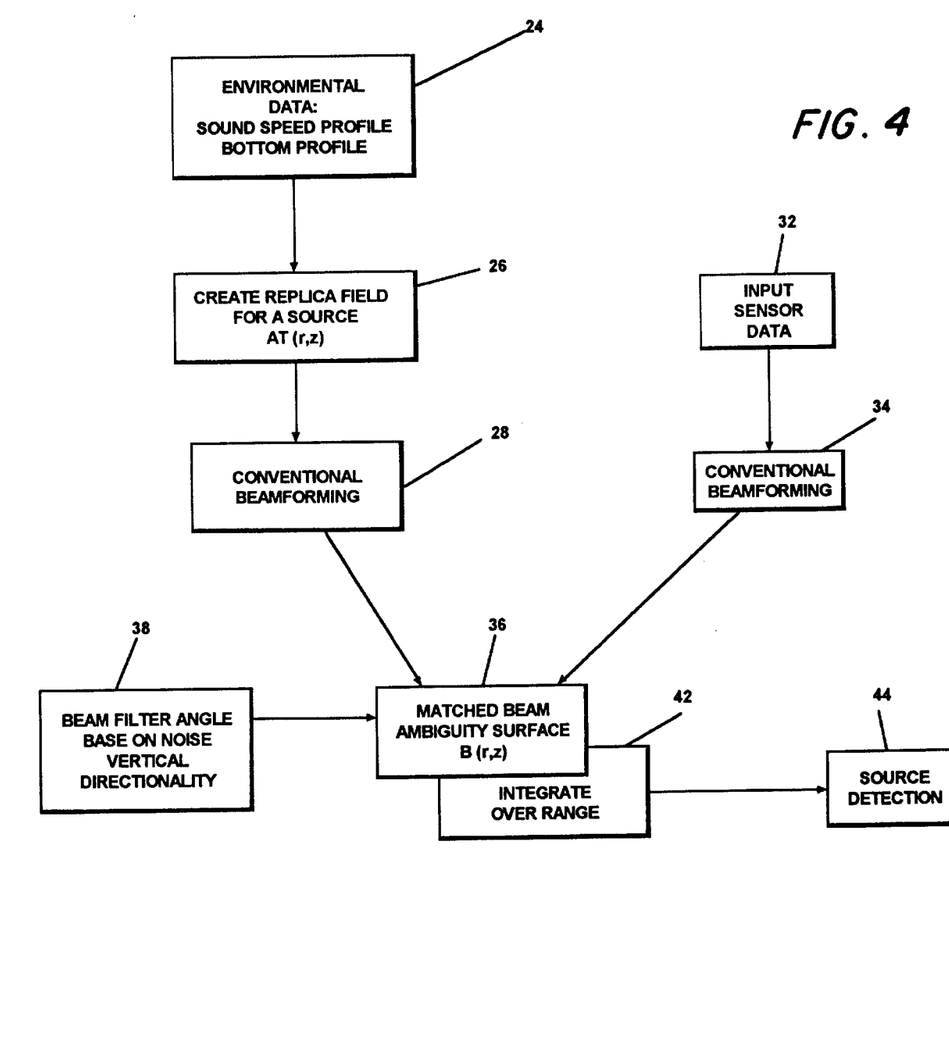
FIG. 4 shows a flow chart of the processor algorithm.
Figure 5:
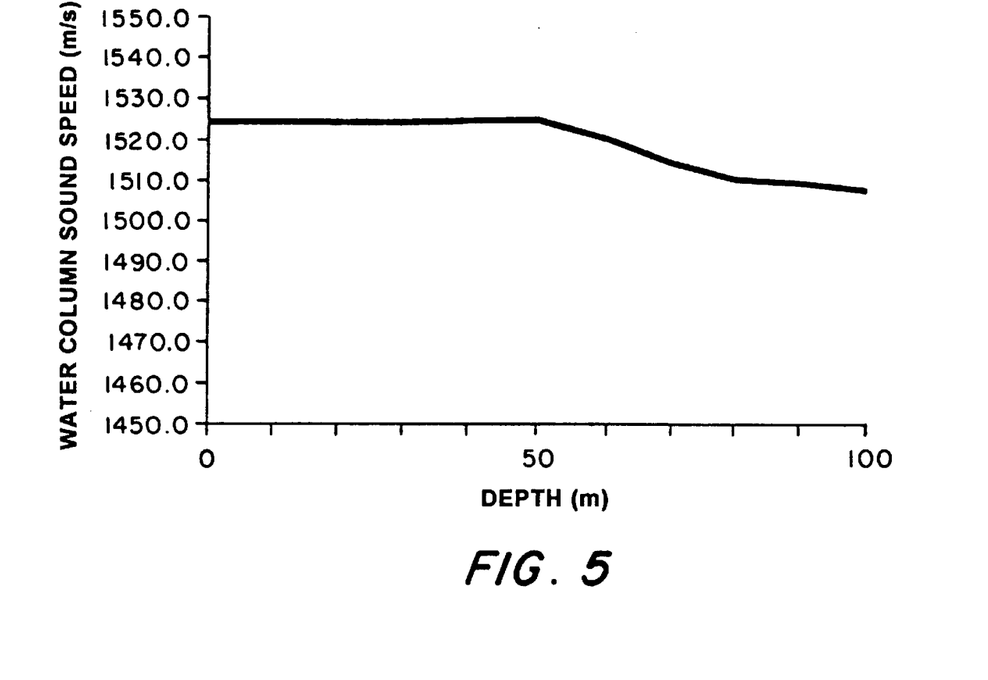
FIG. 5 shows a typical water column sound speed.
Figure 6:
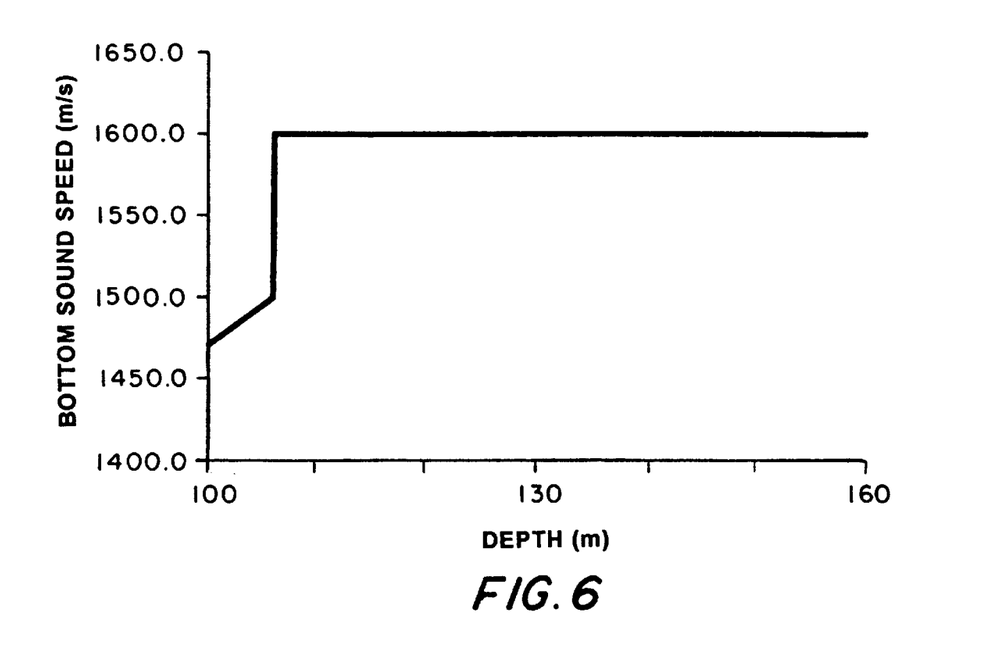
FIG. 6 shows a typical bottom sound speed.

Referring to FIG. 4, the flow of calculations within the processor are shown, as implemented by the computer program at Appendix I. The environmental data 24 (e.g., sound speed profile and bottom profile are obtained from such charts as FIGS. 5 and 6, respectively, and used to create a replica field for a source 26 at r,z. By conventional beamforming 28 a set of replica beams is obtained. Input sensor data 32 is used to obtain data beams through conventional beamforming 34. The replica beams through the conventional beamforming 28 of the replica field and the data beams obtained from the conventional beamforming 34 from the sensor data, as well as a beam filter angle based on noise directionality 38 are used to obtain a matched beam ambiguity surface B(r,z) which is integrated over the range 42 providing a source detection 44. This sequence of computations are shown in the algorithm, as shown in Appendix I.

The signal processing estimates the vertical directionality of the noise field using either noise data or noise simulations and estimate the expected arrival angle of a distant submerged source. See, Yang et al.; MODELING THE ENVIRONMENTAL INFLUENCE ON NOISE VERTICAL DIRECTIONALITY IN SHALLOW WATER; J. Acoust. Soc. Am., Vol. 101, pp. 2541–2554, May 1997; and Porter; THE KRAKEN NORMAL MODE PROGRAM; NRL/MR/5120-92-6920, May 22, 1992; both of which are hereby incorporated in total by reference. Use the difference of the arrival angles to set the beam filter.

Matched beam processing is then applied to create the matched beam range depth ambiguity surface with a beam filter. Integrate over the expected range window to create an ambiguity function as a function of depth. This is the detector for a submerged source.

When a submerged source is indicated by the detector, recalculate the range and depth ambiguity using a minimum variance matched beam processor with a beam filter to find the source range. The range and depth are then displayed on a video display 18 or recorded on a digital recorder 22.

The subject invention uses a processor which can be used to indicate the presence of a submerged source within a circular area formed by the detection range of the processor without requiring a pre-determination of the source range. The extended detection range is obtained using the matched beam processor because the signal is processed coherently and the noise is suppressed by a beam filter. Using MBP it is found that the source has many high level sidelobes at the same depth as the source depths but spread over many ranges. By integrating the ambiguity surface over a range window (e.g., several kilometers) around the range of an expected source, the processor yields a high signal-to-noise ratio as a function of the search depth. This results in a detector as a function of depth which can be used to detect a submerged source without knowing the source range in advance. It thus provides a means for an early warning system or for area clearance which requires the knowledge whether a source is present in the designated area (without requiring the source range being known). Source range can be estimated with additional processing using minimum variance beam processor with a beam filter, which is a reduced rank minimal variance processor. It is noted that source range estimation is sensitive to environmental mismatch. The depth detector which does not require the source range to be known is expected to be insensitive to environmental mismatch. The reduced rank minimal variance processor has been known to reduce sensitivity to environmental mismatch.

Figure 7:
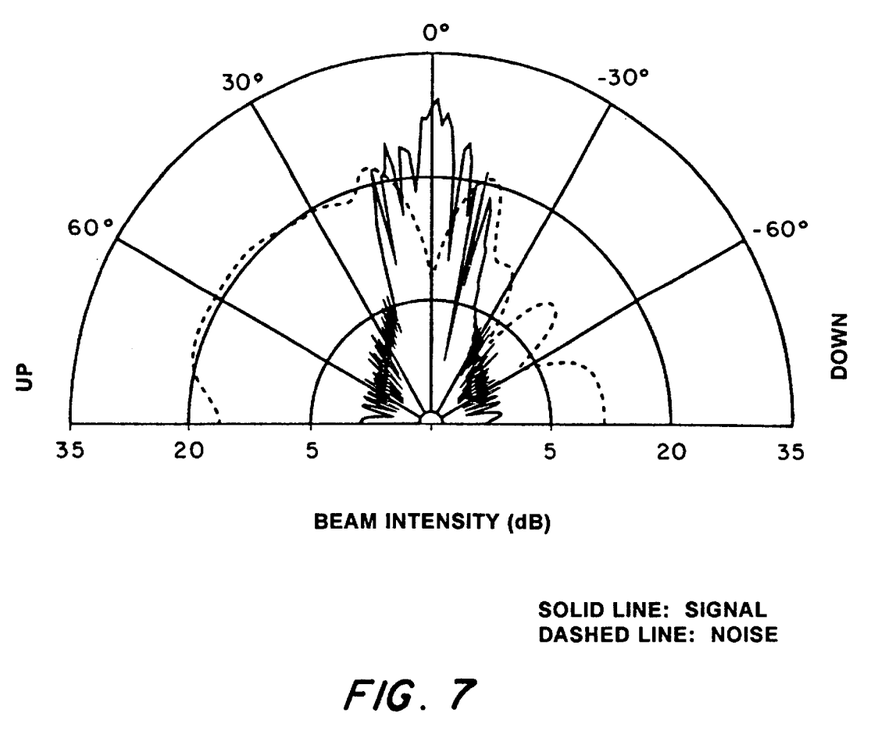
FIG. 7 shows the mode amplitude distributions excited by a deep and surface source.

In the downward refractive environment, the vertical directionality of the noise field (noise vertical beam power distribution) has a notch at near the horizontal direction. In this environment, the lower order mode depth functions peak at the lower half of the water column. Consequently, surface noise sources couple weakly with low order modes and strongly with higher order (>7) modes. See FIG. 2. Since the low and high order modes arrive at shallow and steep grazing angles respectively, the weak coupling of the noise sources to the low order modes results in low beam levels at shallow angles. Hence the vertical directionality of the noise exhibits a noise notch. A submerged source, e.g., at a depth of 90 m, would couple strongly with the low order modes. The signal from this source is at the direction of the noise notch, as shown in FIG. 7. The difference of the signal and noise arrivals is exploited to achieve a high array gain (AG).

This invention incorporates coherent processing of the signal as in matched field processing, beam filtering of the wind generated and ship radiated noise as in conventional beamforming, and energy detection focused on the submerged object using depth discrimination. Initial detection assumes the object inside a certain search range. Detection is improved by zooming in on the source range. Detection range nearly double that of conventional beam and matched field processors is achieved.

The suppression of surface generated noise sources and ship noise results in an extended detection range compared with various processors either in use or those proposed.

Again referring to FIG. 3, the processor 12 described above is an energy detector focused on the returns of a deep source. This technique can be used for area clearance over a large area to indicate whether a source is in the area or not without actually localizing the source in range. As such it can be used as a warning system. Source range can be estimated when required by additional processing. Source location can be estimated using multiple vertical arrays 12 either air deployed or deployed by other means. This device makes it feasible for a practical system using multiple vertical arrays 12 with an in-buoy processor 14 chip for source detection and localization over a large area.

A submerged source may be discriminated against the surface ships using depth as a discriminator. Matched field can discriminate the submerged source from the surface ship but it requires the range of the source to be simultaneously determined. Source localization in shallow water has the well-known environmental mismatch problem.

The invention may be applied to both passive and active signal returns.

The techniques utilized in this invention are similarly, mathematically, to that shown in the parent U.S. Pat. No. 5,914,912, filed on Nov. 28, 1997, entitled SONAR ARRAY POST PROCESSOR, by T. C. Yang. However, significant differences occur when applying the techniques to a vertical array as opposed to a horizontal array. Comparatively these differences are as follows:

| Item | Advanced Vertical Array Beamformer | Sonar Array Post Processor |
| --- | --- | --- |
| Sensor/arrays | Vertical Arrays | Horizontal Arrays |
| System Applications | VLAD sonobuoys | Towed array/bottom mounted arrays |
| Processing Variables | Depth and then Range (No bearing information) | Bearing and then range (Depth is a parameter) |
| Thrust | Adaptive Noise Processing | Adaptive Signal Processing |
| Objective (Primary) | Area Clearance | Accurate Target Bearing Estimation |
| Advantages over Other Methods | Extended Detection Range | Extended Detection Range |

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. A device for acoustic beamforming for an underwater vertical array comprised of:

an array of acoustic receivers arranged in a vertical pattern to detect an underwater signal source;

means for processing an acoustic signal to produce
   an estimate of vertical directionality of a noise field;
   an estimate of an expected angle of arrival of an acoustic signal from a distant submerged source;
   a matched beam range-depth ambiguity surface by applying matched beam processing;
   an integration over an expected range window to create an ambiguity function as a function of depth; and
   a recalculation of range and depth ambiguity using minimum variance matched beam processing with a beam filter to find the source range when a submerged source is indicated by the detector;

means for displaying the submerged sources range and depth; and means for recording the submerged range and depth information.

2. A device, as in claim 1, wherein the means for processing an acoustic signal is a computer.

3. A device, as in claim 1, wherein the means for displaying the submerged sources range and depth is a video display.

4. A device, as in claim 1, wherein the means for recording the submerged range and depth information is a digital recorder.

5. A method for acoustic beamforming for an underwater vertical array comprising the step of:

estimating the vertical directionality of a noise field;

estimating the expected angle of arrival of an acoustic signal from a distant submerged source;

applying matched beam processing techniques to obtain a matched beam range-depth ambiguity surface;

integrating over an expected range window to create an ambiguity function as a function of depth;

recalculating range and depth ambiguity using minimum variance matched beam processing with a beam filter to find the source range when a submerged source is indicated by the detector;

displaying the submerged sources range and depth; and recording the submerged sources and depth.

* * * * *